United States Patent [19]

Kinoshita et al.

[11] Patent Number: 5,642,093
[45] Date of Patent: Jun. 24, 1997

[54] WARNING SYSTEM FOR VEHICLE

[75] Inventors: Masahiro Kinoshita, Oota; Atsushi Ikeda, Ashikaga; Kazumasa Arai, Oota, all of Japan

[73] Assignee: Fuji Jukogyo Kabushiki Kaisha, Tokyo, Japan

[21] Appl. No.: 591,007

[22] Filed: Jan. 24, 1996

[30] Foreign Application Priority Data

Jan. 27, 1995 [JP] Japan ................................. 7-011837
Jan. 27, 1995 [JP] Japan ................................. 7-011838

[51] Int. Cl.$^6$ ........................... B60Q 1/00; G08G 1/16
[52] U.S. Cl. .................... 340/439; 340/521; 340/517; 340/903; 340/905; 340/576; 340/435; 180/167; 180/272; 364/461; 364/423.098; 348/148; 348/149
[58] Field of Search ...................... 340/439, 576, 340/937, 573, 905, 903, 435, 436, 517, 521, 522; 180/272, 167; 364/413.04, 461, 424.02, 424.01; 348/148, 149, 142, 135

[56] References Cited

U.S. PATENT DOCUMENTS 5,432,509  7/1995  Kajiwara ................................. 340/903
5,467,284  11/1995  Yoshioka et al. ........................ 340/903
5,475,494  12/1995  Nishida et al. .......................... 340/903

Primary Examiner—Donnie L. Crosland
Attorney, Agent, or Firm—Beveridge, DeGrandi, Weilaher & Young, L.L.P.

[57] ABSTRACT

A warning system for a vehicle obtains image data by three-dimensionally recognizing a road extending ahead of the vehicle and traffic conditions, decides that driver's wakefulness is on a high level when there is any one of psychological stimuli to the driver or that driver's wakefulness is on a low level when there is not psychological stimulus to the driver, estimates the possibilities of collision and off-lane travel, and gives the driver a warning against collision or off-lane travel when there is the high possibility of collision or off-lane travel. Another warning system for a vehicle obtains image data by three-dimensionally recognizing a road extending ahead of the vehicle and traffic conditions, discriminates between automobile roads and open roads on the basis of the image data and a traveling mode in which the vehicle is traveling, determines patterns of driving operations and traveling motions in a given time at the initial stage of travel on the road when the road is identified to be an automobile road, repeats the determination of patterns at given time intervals, detects dozed driving through the comparison of a reference value and a measured value and gives the driver a warning against dozing when the driver's wakefulness declines.

6 Claims, 12 Drawing Sheets

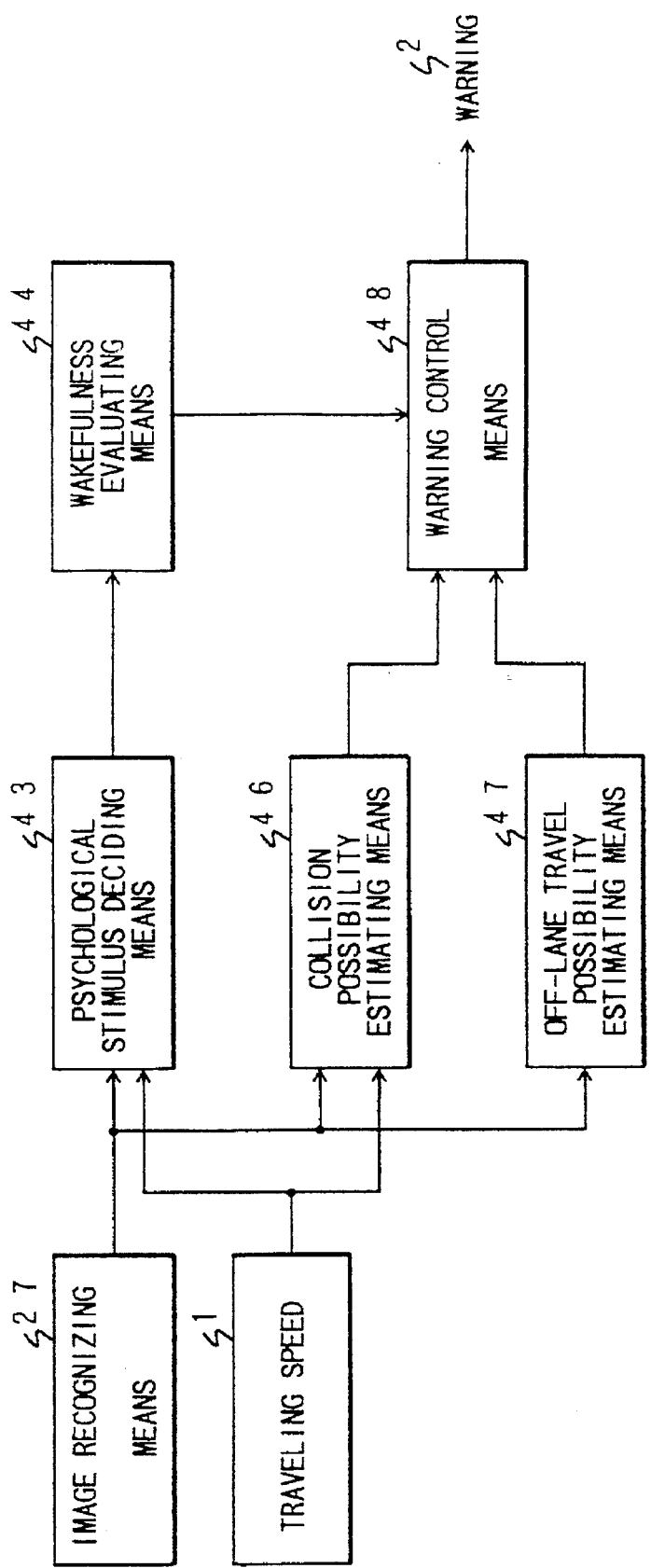
F I G. 1

WARNING SYSTEM FOR VEHICLE

BACKGROUND OF THE INVENTION

1. Field of the Invention

The present invention relates to a warning system for a vehicle, for assisting the driver in safety driving and, more specifically, to a warning system for preventing the driver from falling into a doze while driving a vehicle, avoiding collision and preventing swerving of the vehicle from their lane without driver's intention.

2. Description of the Related Art

Recently, an ADA system (Active Drive Assist system), i.e., a comprehensive driver assisting system for actively assisting the driver in driving a vehicle, has been developed in an attempt to enhance the safety of vehicles to cope with progressively increasing traffic accidents. The recognition of the environments of the vehicle is an essential function of the ADA system. Recent advanced technology has made possible the three-dimensional recognition of road conditions and traffic conditions in a practically effective accuracy and time by processing image information about a scene lying ahead of the vehicle acquired by a plurality of cameras. The ADA system is intended to assist the driver in safety driving in many respects by using image data on road conditions and traffic conditions when the driver fails in correct driving operations, when the driver looks aside and/or when the driver dozes off during monotonous driving.

A previously proposed drive assistance system is based on a conception that every operation of a vehicle is to be controlled by a man and intends preventive security for avoiding expected dangers. The drive assistance system gives a warning to warn the driver against an expected danger to assist the driver in safety driving when a car collision or off-course travel is expected and, if the driver does not take appropriate measures to avoid danger in response to the warning, carries out operations temporarily for the driver to avoid a car collision or off-course travel by automatically controlling the brake system, the throttle and/or the steering system to return the traveling condition of the vehicle to safety.

The warning provided by the ADA system would be very useful for the driver to estimate various possible incidents and for enhancing preventive security. Therefore, it is necessary to give a warning properly to enable the driver to take danger avoiding measures by deciding the situation and accurately estimating possible incidents, effectively using image data.

Driver's dozing during driving due to the declination of wakefulness is one of the possible incidents. Roads on which vehicles travel are classified roughly into open roads and automobile roads, such as freeways and superhighways. Since open roads are used by both vehicles and pedestrians and traffic signals are installed on open roads, the driver needs to perform frequently driving operations for starting, accelerating, stopping, turning along sharp curves and such, and is required to pay attention continuously to pedestrians for safety driving. Therefore, the driver is prevented from falling into a doze by continuous stimulation during driving on open roads and hence driver's wakefulness is maintained necessarily on a high level. Generally, driver's wakefulness declines during extended travel in a monotonous traveling mode in which driver's frequent driving operations are unnecessary. Traffic conditions of automobile roads, differing from those on open roads, force the driver to perform long, monotonous driving operations and, consequently, driver's wakefulness declines and the driver is liable to fall into a doze. However, driver's wakefulness is maintained on a high level even if the vehicle travels on a long, straight road requiring only a few driving operations when even only one of psychological stimuli, such as a stimulus received from another vehicle overtaking the vehicle or cutting into the way of the vehicle and a stimulus received from a narrow lane, and visual stimuli is provided to the driver. Accordingly, it is desirable to determine the degree of driver's wakefulness through the detection of visible matters that provide psychological stimuli to the driver and to give the driver a warning against dozing. It is necessary to determine whether the vehicle is traveling on an automobile road or an open road and to watch the driver for dozing particularly when the vehicle travels on an automobile road.

As is generally known, dozed men's driving has a high possibility of causing collision against the preceding vehicle or off-lane travel. Therefore, it is desirable to warn the driver for preventive security at an early stage to prevent driver's doze off when driver's wakefulness is on a low level and car collision and off-lane travel is expected.

A first prior art doze warning system disclosed in JP-B No. 59-16968 sets a fixed road section, decides that the road section is a monotonous one when the number of operations executed in the road section is not greater than a set number, and provides awakening alarm when the number of successive monotonous road sections exceeds a reference number. A second prior art doze warning system disclosed in JP-B No. 59-16969 decides the vehicle is traveling in a monotonous traveling mode when the frequency of variation of the angular position of the steering wheel or the operating position of the accelerator is less than a set frequency. A third prior art doze warning system disclosed in JP-B No. 61-53250 detects an environment that will possibly lower the level of driver's senses on the basis of the mode of steering operation, accumulates steering angles through which the steering wheel were turned in the environment, decides the condition of the road on the basis of the cumulative steering angle, decides that the condition of the road is monotonous and gives a warning when the cumulative steering angle is less than a set value.

A fourth prior art doze warning system disclosed in JP-A No. 5-162596 determines safety car-to-car distances for traveling speeds beforehand, decides that collision is possible when the current car-to-car distance is less than a safety car-to-car distance for the traveling speed of the vehicle and gives a warning. The timing of giving a warning is adjusted according to the level of driver's senses evaluated on the basis of the means and the standard deviations of car-to-car distances when the brake is applied and car-to-car distances in the normal traveling mode.

Since those prior art doze warning systems detects the monotonous driving mode on the basis of the driver's steering pattern or accelerator operating pattern and gives a warning depending on the condition of the road, and are unable to detect the degree of driver's wakefulness dependent on psychological stimuli, those prior art doze warning systems give an unnecessary warning frequently. Although the level of driver's senses on the basis of which the timing of giving a warning is adjusted is evaluated on the basis of the car-to-car distance at which the brake is operated, the mode of operation of the brake is dependent on traffic conditions and is not a suitable standard for the evaluation of the level of driver's senses.

A fifth prior art dozed driving detecting system disclosed in JP-A No. 5-155269 uses a fact that steering angle varies slowly and low frequency components increase when driver's senses decline for detecting dozed driving. This dozed driving detecting system determines a characteristic frequency peculiar to the driver from the frequency spectrum indicating the movements of the vehicle in the normal traveling mode, extracts a low-frequency component of a frequency lower than the characteristic frequency at predetermined time after the start of driving operation by a predetermined value, and determines whether or not the driver is in dozed driving on the basis of the result of comparison between the low-frequency component and a set threshold.

A sixth prior art dozed driving detecting system disclosed in JP-A No. 5-178115 uses a fact that the driver becomes aware of an abnormal transverse deviation of the vehicle with a delay and needs a comparatively long time for correcting the traveling course of the vehicle when the driver's senses are lowered. This dozed driving detecting system calculates a reference position, i.e., a position of the vehicle in the normal traveling mode, measures the returning time spent to return the vehicle from a displaced position to the reference position when the vehicle is displaced from the reference position at time after the start of traveling, and decides whether or not the driver is in dozed driving on the basis of the result of comparison between the returning time and a given time.

The fifth and sixth prior art dozed driving detecting system do not discriminate between open roads and automobile roads and hence the following problems resides in those dozed driving detecting systems. Generally, open roads have comparatively narrow lanes, there are pedestrians and parking cars and bicycles on the edge sections of open roads, vehicles traveling near and on the opposite sides of the center line travel in opposite directions, and vehicles travel at comparatively low traveling speeds in the central sections near the center line or in the outer sections of roads. On the other hand, automobile roads have wide lanes and vehicles travel rapidly through the substantially central section of wide lanes. Therefore, the traveling pattern of vehicles and the pattern of driver's driving operation on automobile roads are greatly different from those on open roads. Accordingly, driver's doze cannot be accurately detected when the reference traveling pattern of the vehicle and the reference position of the vehicle determined on the basis of traffic conditions of open roads are applied to detecting driver's doze when the driver is driving the vehicle on automobile roads.

SUMMARY OF THE INVENTION

Accordingly it is an object of the present invention to provide a warning system capable of directly and accurately deciding the degree of wakefulness of the driver of a vehicle from psychological stimuli to the driver and of surely preventing driver's doze and resultant collision and off-lane travel.

Another object of the present invention is to provide a warning system capable of properly detecting an automobile road on which the driver driving a vehicle is liable to fall into a doze by electrical means, of surely detecting driver's doze and of warning the driver against dozing.

According to a first aspect of the present invention, a warning system for a vehicle comprises an image recognizing means capable of obtaining three-dimensionally image data on the load extending ahead of the vehicle and traffic conditions, a psychological stimulus deciding means for deciding whether or not there is any one of psychological stimuli to the driver including moving objects and obstacles in the user's field of view on the basis of the image data on the configuration of the road extending ahead of the vehicle, traffic conditions and the traveling speed of the vehicle, a wakefulness evaluating means for deciding that the driver's wakefulness is high when there is even a single psychological stimulus to the driver or that the driver's wakefulness has declined when a state where there is no psychological stimulus at all to the driver continues for a given time, a collision possibility estimating means for estimating the possibility of collision of the vehicle with an obstacle on the basis of the image data and the traveling speed of the vehicle, an off-lane travel possibility estimating means for estimating the possibility of off-lane travel of the vehicle on the basis of the image data, and a warning control means for timing the issuance of a warning when the wakefulness evaluating means decides that the driver's wakefulness has declined, when the collision possibility estimating means estimates collision to be possible or when the off-lane travel possibility estimating means estimates off-lane travel to be possible.

According to a second aspect of the present invention, the psychological stimulus deciding means of the warning system may decide that the environment is psychologically stimulative when the environment provides at least one of conditions that the width of the lane is not greater than a set width, that the variation of the radius of curvature of the lane is not less than a set value, there is a preceding vehicle, that there is the possibility of the vehicle colliding with a preceding vehicle, that there are parking vehicles on the road and that there are obstacles on the road, or decides that the environment is not psychologically stimulative when the environment does not provide any one of those conditions.

According to the third aspect of the present invention, the warning control means of the warning system may time a collision possibility estimating operation, an off-lane travel possibility estimating operation and a warning operation so that the possibilities of collision and the possibility of off-lane travel are estimated earlier when the wakefulness evaluating means decides that the driver's wakefulness has declined.

In the warning system in the first aspect of the present invention, the image recognizing means recognizes the condition of the road extending ahead of the vehicle and traffic conditions continuously and provides image data on the positions of lane marks and the positions and the shapes of obstacles and the traveling speed of the vehicle. The psychologically stimulus deciding means detects moving objects and obstacles in the driver's field of view on the basis of the image data and the traveling speed, calculates road conditions and decides on the basis of the calculated road conditions whether or not there is any psychological stimulus that requires driver's operations or that impose psychological load on the driver or stimulates the driver's sense of sight. The wakefulness evaluating means detects directly and accurately the decline of driver's wakefulness when a state where there is no psychological stimulus to the driver at all continues for a given time when driver's operations are monotonous due to the configuration of the road. Consequently, the accuracy of a warning operation against dozing for preventive safety is enhanced greatly.

The collision possibility estimating means estimates the possibility of collision, the off-lane travel possibility estimating means estimates the possibility of off-lane travel and the warning control means gives a warning to prevent the driver from dozing when the declination of driver's wakefulness is detected. When the possibility of collision or off-lane travel is estimated while the driver's wakefulness is low, the warning control means times the warning operation to provide a warning earlier to prevent surely driver's falling into a doze and the resultant collision and off-lane travel.

In the warning system in the second aspect of the present invention, the psychological stimulus evaluating means regards as psychological stimuli to driver's sense of sight conditions that the width of the lane is not greater than a set width, that the variation of the radius of curvature of the lane is not less than a set value, there is a preceding vehicle, that there is the possibility of the vehicle colliding with a preceding vehicle, that there are parking vehicles on the road and that there are obstacles on the road, and decides that the environment is psychologically stimulative and the driver's wakefulness is high when the environment provides any one of those conditions or that the environment is not psychologically stimulative and the driver's wakefulness is liable to decline when the environment does not provide any one of those conditions. Consequently, it is possible to decide precisely whether or not there is any psychological stimulus which can be perceived by the driver, imposes psychological road on the driver and provides a psychological stimulus to the driver, and the image data is used effectively.

In the warning system in the third aspect of the present invention, the warning control means controls a warning operation when collision or off-lane travel is expected so that a warning is given early to prevent surely driver's falling into a doze and the resultant collision or off-lane travel.

According to a fourth aspect of the present invention, a warning system for a vehicle comprises an image recognizing means capable of obtaining three-dimensional image data on the road extending ahead of the vehicle and traffic conditions, a road discriminating means for discriminating between automobile roads and open roads on the basis of the image data and traveling condition, a reference value calculating means for determining patterns of driving operations and traveling motions in a given time at the initial stage of travel on a road when the road on which the vehicle is traveling is identified to be an automobile road and calculating a reference value specific to the automobile road, an operation/motion pattern calculating means for repeatedly determining patterns of driving operations and traveling motions and processing the measured values after the given time at the initial stage of travel on the road has elapsed while the vehicle is traveling on an automobile road, and a dozing detecting means for detecting driver's doze by comparing the reference value and the measured value and giving a warning upon the detection of driver's doze.

According to a fifth aspect of the present invention, the road discriminating means identifies an automobile road by toll booth and road signs represented by the image data or by traveling speed, the configuration and the size of the road represented by the image data, and a distance covered in a given time.

According to a sixth aspect of the present invention, the reference value calculating means calculates a transverse displacement of the vehicle relative to the lane on the basis of the image data, calculates reference values defining the traveling pattern of the vehicle using standard deviation of transverse displacements in a given time, and the operation/motion pattern calculating means processes measured values specifying the traveling pattern.

In the warning system in the fourth aspect of the present invention, the image recognizing means recognizes the road extending ahead of the vehicle and traffic conditions continuously while the vehicle is traveling, the road discriminating means decides whether or not the road on which the vehicle is traveling is an automobile road on the basis of a toll booth and road signs represented by the image data or the configuration of the road and the traveling mode. When the road on which the vehicle is traveling is identified to be an automobile road, the reference value calculating means measures patterns of driving operations and traveling motions in a given initial time and calculates reference values specific to the automobile road in a state where driver's wakefulness is high, taking into consideration individual variation. When the vehicle is traveling on an automobile road, the operation/motion pattern calculating means processes measured values indicating a driving pattern and a traveling pattern in which the driver drives the vehicle and the vehicle travels in continuous, monotonous traveling at given time intervals. Consequently, dozed driving on an automobile road can be precisely detected. Since an operating pattern and a traveling pattern are determined on the basis of measured data in the initial stage of traveling on an automobile road every time the vehicle enters an automobile road to calculate a reference value specific to the automobile road, individual variation can be taken into consideration in carrying out the warning operation The doze detecting means compares the reference values and the measured values to detect the condition of the driver on the basis of the reference values specific to the automobile road acquired in the initial stage of traveling at which driver's wakefulness is high, so that driver's doze can be properly detected. When the differences of the measured values from the corresponding reference values due to the excessive transverse deviation of the vehicle from the correct course attributable to the inappropriate driving operations of the driver due to the declination of driver's wakefulness during monotonous travel become excessively large, the driving mode is identified to be a dozed driving mode and a warning is given to call driver's attention.

In the warning system in the fifth aspect of the present invention, the road discriminating means surely identifies an automobile road by a toll booth and road signs represented by the image data, which facilitates the control operation. When discriminating between an automobile road and an open road on the basis of the configuration and the size of the road represented by the image data and a distance covered in a given timer the recognition of a toll booth and road signs is unnecessary and, since the reference value determined at the initial stage of traveling on an automobile road is cleared and a new reference value is determined when the conditions of the driver and the vehicle are changed after traveling on the automobile road due to change of drivers or fitting the tires with tire chains, the detection can be achieved in a high accuracy.

In the warning system in the sixth aspect of the present invention, the reference value calculating means calculates a transverse displacement of the vehicle relative to the lane on the basis of the image data, calculates reference values defining the traveling pattern of the vehicle using standard deviation of transverse displacements in a given time, the operation/motion pattern calculating means processes measured values specifying the traveling pattern, and dozed driving is detected on the basis of the results of comparison between the reference values and measured values representing the traveling pattern. Thus, dozed driving can be detected at an early stage when the behavior of the vehicle varies greatly due to high-speed traveling even if the steering wheels and other operating means are operated slightly while the vehicle is traveling on an automobile road.

BRIEF DESCRIPTION OF THE DRAWINGS

The above and other objects, features and advantages of the present invention will become more apparent from the following description taken in connection with the accompanying drawings, in which:

FIG. 1 is a block diagram of a warning system for a vehicle, in accordance with a first aspect of the present invention;

DETAILED DESCRIPTION OF THE PREFERRED EMBODIMENTS

Figure 2:
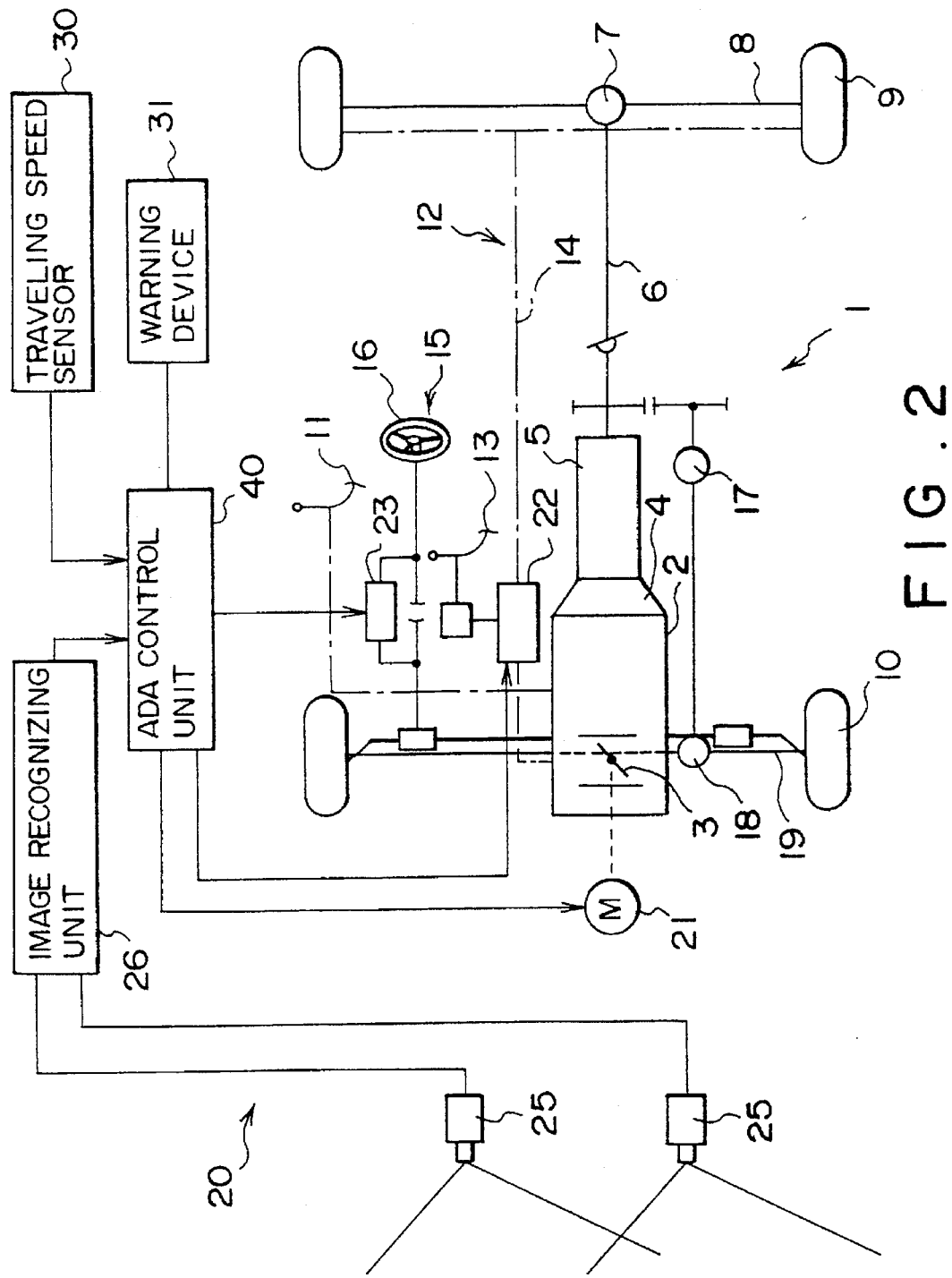
FIG. 2 is a partly diagrammatic block diagram of an ADA system and a vehicle.

An ADA system incorporated into a vehicle will be generally described with reference to FIG. 2. A vehicle 1 has an engine 2 operatively connected through a clutch 4, a transmission 5, a propeller shaft 6, a rear differential 7 and rear axles 8 to rear wheels 9, and through the transmission 5, a center differential 17, a front differential 18 and front axles 19 to front wheels 10 to drive the front wheels 10 and the rear wheels 9 for traveling. The vehicle 1 has an operation control system including an accelerator pedal 13 for operating a throttle valve 3 combined with the engine 2 to regulate the output of the engine 2, a brake system 12 including a brake pedal 13 for regulating the brake line pressure in a brake line 14 for distributing the brake line pressure to wheel cylinders combined with the front wheels 10 and the rear wheels 9, and a steering system 15 including a steering wheel 16 for steering the front wheels 10.

An ADA system 20 is provided with a throttle actuator 21 combined with the throttle valve 3 to reduce the output of the engine 2 forcibly when a throttle signal is given thereto, a brake actuator 22 connected to the brake line 14 of the brake system 12 to regulate the brake line pressure according to a brake signal for automatic braking, and a steering actuator 23 associated with the steering system 15 to control the steering wheel 16 according to a steering signal for automatic steering.

An electronic control system is provided with, for example, two CCD cameras 25 provided on the right and the left side of the front end, respectively, of the vehicle 1, and an image recognizing unit 26 including a stereographic image processor. The two CCD cameras 25 take images of scenes and objects lying ahead of the vehicle 1 in stereographic images and provides image signals. The image recognizing unit 26 processes the output image signals of the CCD cameras 25 by triangulation to calculate the distances between the vehicle 1 and the objects lying ahead of the vehicle 1, produces a distance picture showing a three-dimensional distance distribution, detects a lane, a preceding vehicle and obstacles separately from the distance picture, recognizes lane marks, the three-dimensional configuration of the road, categorizes objects lying ahead of the vehicle 1, recognizes the distances between the vehicle 1, and the preceding vehicle and the obstacles, and relative traveling speed of the preceding vehicle, and obtains image data on the road and traffic conditions.

An ADA control unit 40 comprises a warning system which estimates various possible conditions and gives a warning, and a vehicle control system which controls the vehicle 1 when the driver fails in executing danger avoiding operations in response to a warning. The vehicle control system calculates an acceleration or deceleration on the basis of the image data and the output signals of sensors so that a safety distances are maintained between the vehicle 1 and, for example, the preceding vehicle and road facilities, and gives a throttle signal specifying a throttle opening corresponding to the calculated acceleration or deceleration to the throttle valve 21 to control the output of the engine 2. The vehicle control system gives a brake signal specifying an appropriate brake line pressure corresponding to the calculated acceleration or deceleration to the brake actuator 22 for automatic braking. Thus, the safety distances can be maintained or collision can be avoided even if the driver does not operate the vehicle 1 properly or does not carry out danger avoiding operations. The vehicle control system sets a desired course to a position at a set distance on the picture, calculates an estimated course along which the vehicle 1 will travel to the position at the set distance when the current traveling conditions are maintained, gives a steering signal corresponding to the deviation of the estimated course from the desired course to the steering actuator 23 for automatic steering. Thus, collision can be avoided and off-lane travel can be prevented even if the driver does not operate the vehicle properly.

The warning operation of the warning system for giving warnings against the declination of driver's wakefulness, collision and off-lane travel will be described. The warning system decides moving objects, obstacles and the configuration of the road that can be visually recognized by the driver and will impose psychological load on the driver and will provide psychological stimuli to the driver on the basis of the image data on the road extending ahead of the road, traffic conditions, and traveling speed detected by a traveling speed sensor 30, decides whether or not the psychological stimuli will reduce the degree of driver's wakefulness, and estimates the possibilities of collision against an obstacle and off-lane travel. When it is decided that driver's wakefulness has declined and collision or off-lane travel is possible, the warning system gives a warning 31 at an early stage.

Figure 4:
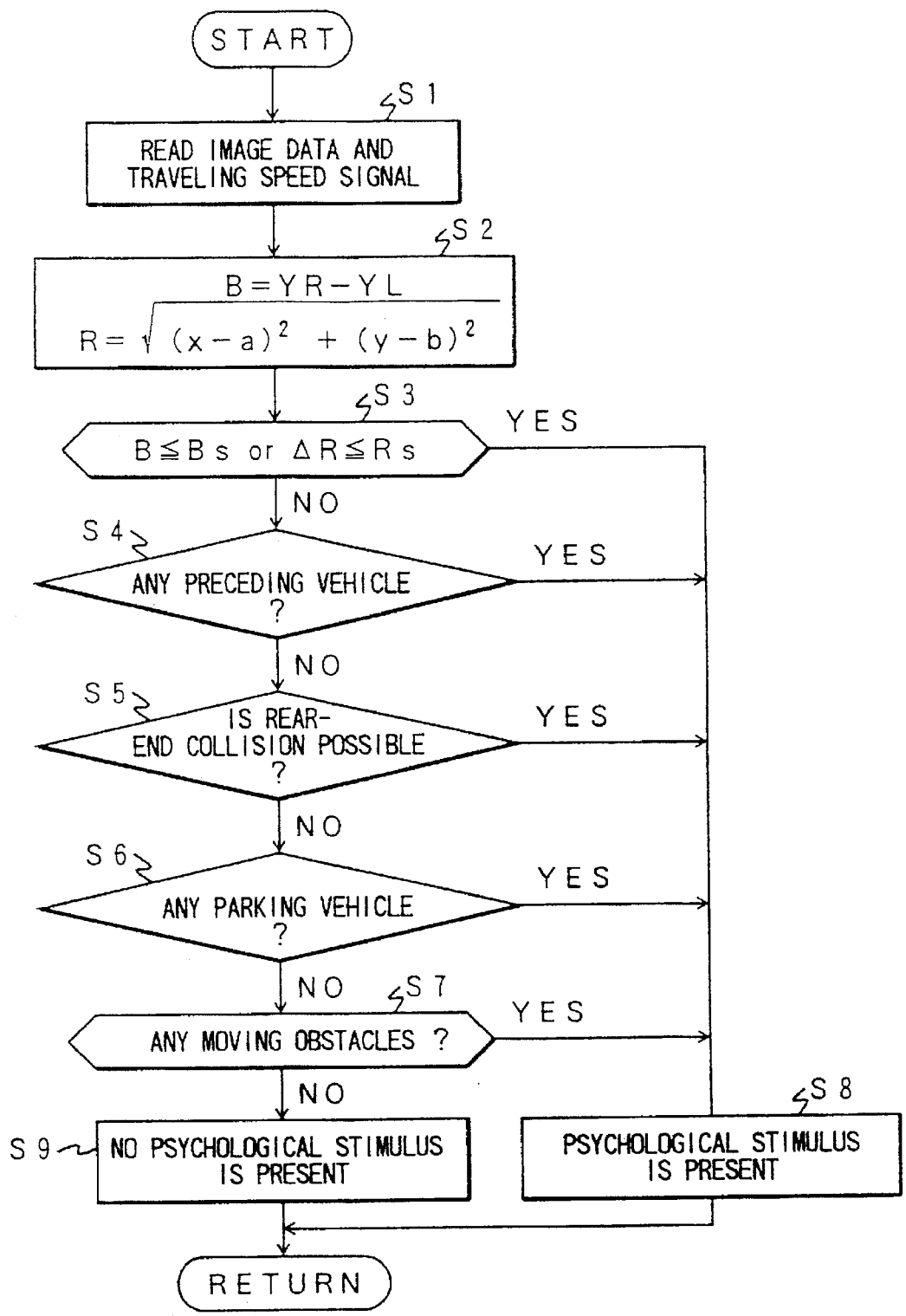
FIG. 4 is a flowchart showing a section deciding a psychological stimulus deciding.
Figure 6A:
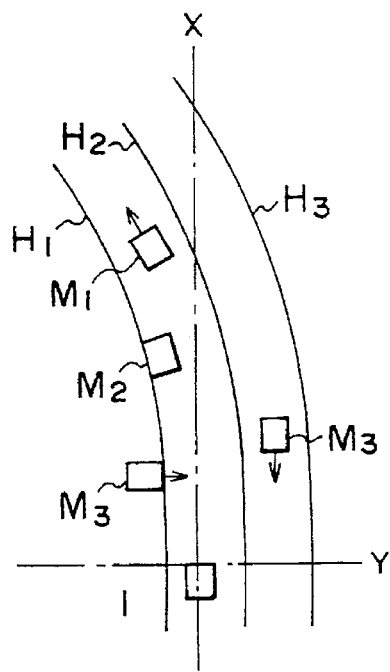
FIGS. 6(a) to 6(e) are diagrammatic views of assistance in explaining image data and a psychological stimulus deciding operation.
Figure 6B:
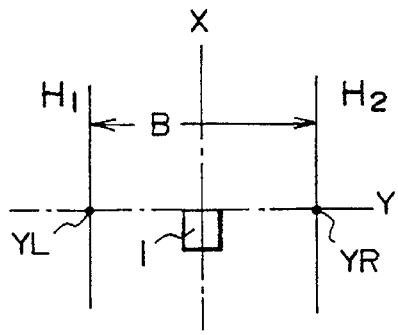

A warning control operation to be carried out by the warning system will be described with reference to FIG. 4. The image recognition unit 26 processes the output image signals of the CCD camera 25 while the vehicle 1 is traveling to obtain image data on the road and traffic conditions in step S1. Supposing that the vehicle 1 is traveling in one of the two lanes of a two-lane road as shown in FIG. 6(a), coordinates specifying the positions and shapes of lane marks $H_1$ to $H_3$, the positions of a preceding vehicle $M_1$, a parking vehicle $M_2$ and moving obstacles $M_3$, such as a crossing vehicle or vehicle on the opposite lane, on an X–Y coordinate system having its origin at the position of the vehicle 1, and data on velocity vectors can be obtained from the image data.

Figure 3:
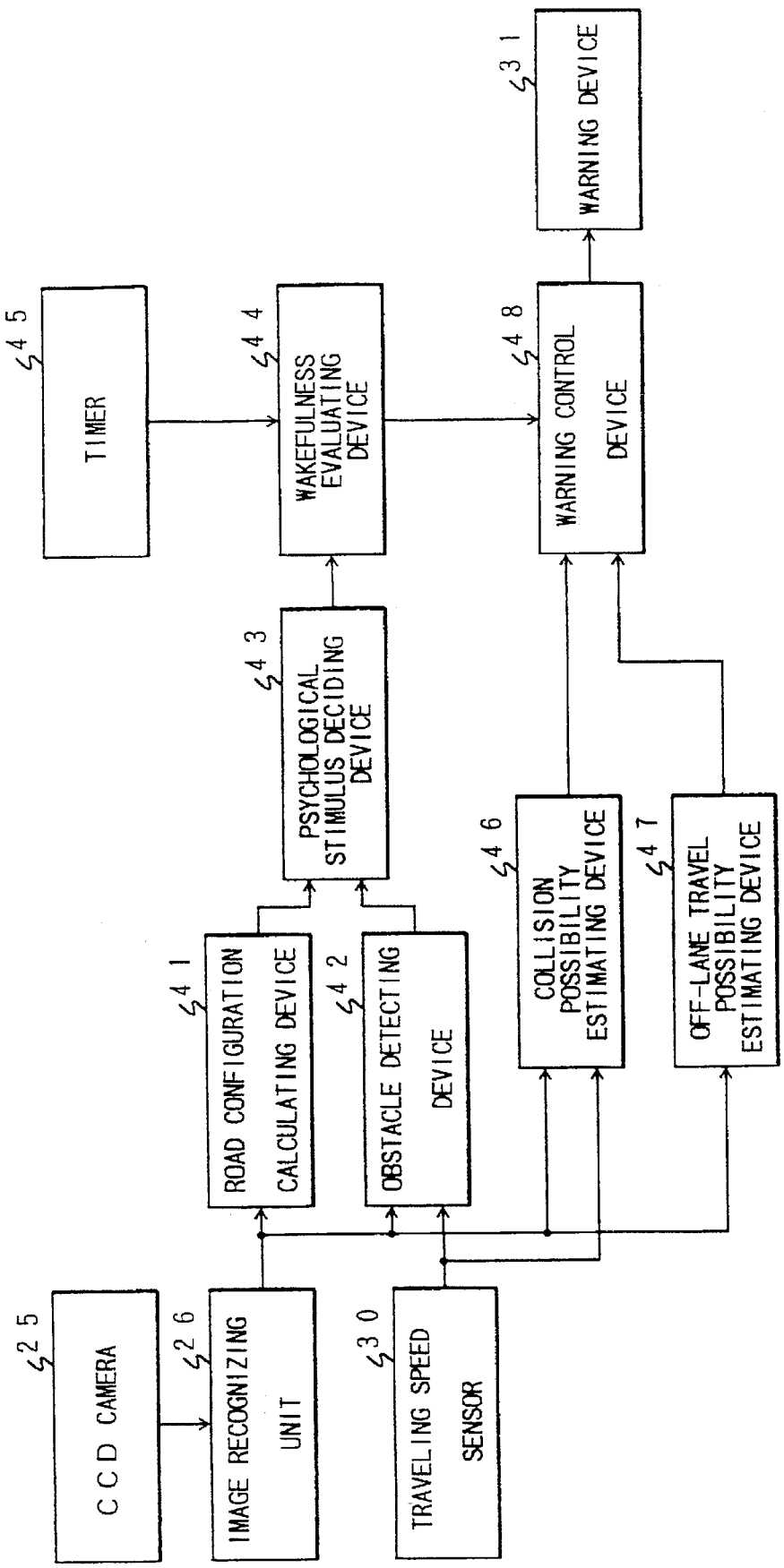
FIG. 3 is a block diagram of a warning system in a first embodiment according to the present invention.

A psychological stimulus deciding control operation will be described with reference to FIGS. 3 and 4. In step S2, a road configuration calculating device 41 included in the ADA control unit 40 receives the image data and calculates the lane width B and a change $\Delta R$ in the radius of curvature of the lane visually perceived by the driver necessary for an appropriate steering operation to be executed by the driver. The lane width B is calculated by using expression: B=YR–YL, where YR and YL are Y-coordinates of points where the Y-axis intersects the right lane mark $H_2$ and the left lane mark $H_1$, respectively.

Figure 6C:
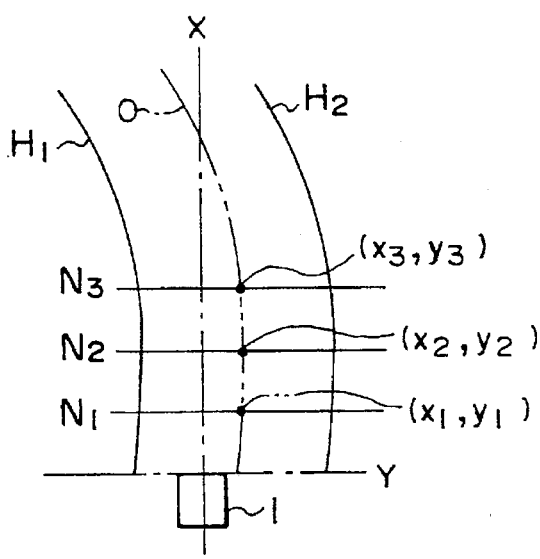

Referring to FIG. 6(c), when calculating the change $\Delta R$ in the radius of curvature, the respective coordinates $(x_1, y_1)$, $(x_2, y_2)$ and $(x_3, y_3)$ of the intersection points of the center line of the lane and three division lines $N_1$, $N_2$ and $N_3$ lying ahead of the vehicle 1 are determined and the radius R of curvature of the lane is calculated by using expression:

$$R = \sqrt{(x-a)^2 + (y-b)^2} ,$$

and then $\Delta R$ is calculated by using expression: $\Delta R=R(n)-R(n-1)$, where R(n) is the radius of curvature calculated in the present calculation cycle and R(n-1) is the radius calculated in the preceding calculation cycle executed a given time interval before the present calculation cycle. A psychological stimulus deciding device 43 receives the lane width B and the change $\Delta R$ in the radius of curvature, and compares the width B and the change $\Delta R$ with set values $B_s$ and $R_s$, respectively in step S3. If the width B of the lane is not greater than the set value $B_s$ or the change $\Delta R$ is not smaller than the set value $R_s$, the psychological stimulus deciding device 43 decides that the lane is a psychological stimulus to the driver requiring an appropriate steering operation in step S8.

Figure 6E:
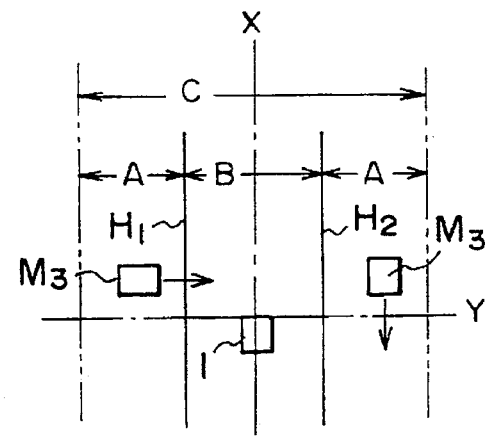
Figure 6D:
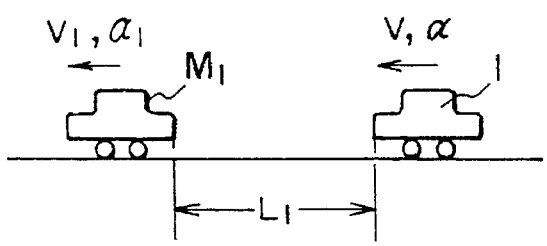

An obstacle detecting device 42 receives the image data and detects the preceding vehicle $M_1$, the parking vehicle $M_2$ and the moving obstacles $M_3$ that require various driving operations and provide visual stimuli. An object traveling forward at a traveling speed is identified to be the preceding vehicle $M_1$. The possibility of collision is estimated on the basis of the relation between the vehicle 1 and the preceding vehicle $M_1$. Suppose that the distance between the vehicle 1 and the preceding vehicle $M_1$ is $L_1$, the traveling speed of the vehicle 1 is V, the traveling speed of the preceding vehicle $M_1$ is $V_1$, a set acceleration/deceleration for the vehicle 1 is $\alpha$, a set acceleration/deceleration for the preceding vehicle $M_1$ is $\alpha_1$ and a set spare time is $T_1$ as shown in FIG. 6(d). Then, it is decided that a rear-end collision is possible when the following inequality is satisfied.

$$L_1 \leq (-V_1^2/2\alpha_1) + ((V^2/2\alpha) + V \cdot T_1$$

A vehicle lying ahead of the vehicle 1 in the lane and having a velocity vector of 0 is identified to be the parking vehicle $M_2$. As shown in FIG. 6(e), a moving obstacle detecting range C of a width C=2A+B is defined by setting marginal ranges A of a width A on the outer side of the lane marks $H_1$ and $H_2$. Moving obstacles, such as oncoming vehicles including bicycles, passing vehicles, crossing vehicles and pedestrians, in the moving obstacle detecting range C are identified to be the moving obstacles $M_3$. The psychological stimulus deciding device 43 receives detection signals provided when those obstacles $M_1$, $M_2$ and $M_3$ are detected. In step S4, the psychological stimulus deciding device 43 makes a query to see whether or not there are any preceding vehicles, estimates the possibility of rear-end collision of the vehicle 1 with the preceding vehicle $M_1$ in step S5, makes a query in step S6 to see whether or not there are any parking vehicles, and makes a query in step S7 to see if there are any moving obstacles. When there is any one of those obstacles ahead of the vehicle 1 or there is the possibility of rear-end collision of the vehicle 1 with the preceding vehicle $M_1$, which requires various driver's driving operations, imposes psychological load on the driver and provides visual stimulus to the driver, the psychological stimulus deciding device 43 decides that there is a psychological stimulus.

Thus, it is decided in step S8 that there is a psychological stimulus to the driver when the environment provides any one of conditions that imposes a psychological load on the driver or provides a visual stimulus to the driver that the width B of the lane is not greater than the set value $B_s$, that there is the preceding vehicle $M_1$, that there is the possibility of collision of the vehicle 1 with the preceding vehicle $M_1$, that there is the parking vehicle $M_2$ and that there are moving obstacles $M_3$. It is decided in step S9 that the environment is not psychologically stimulative when there is none of those conditions that impose a psychological load on the driver or provides a psychological stimulus to the driver.

Figure 5:
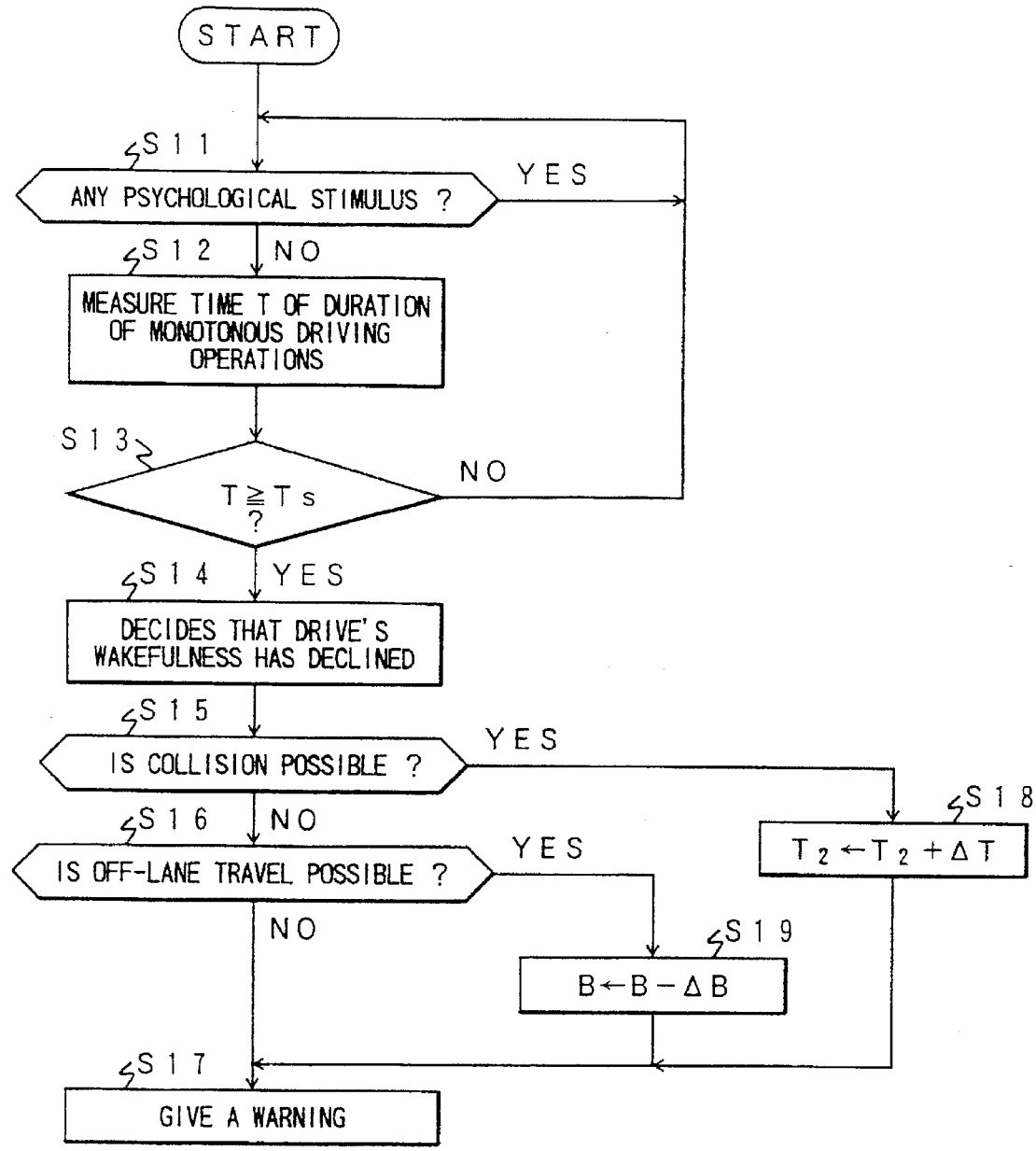
FIG. 5 is a flowchart of a wakefulness evaluating and warning control program.

Procedures for driver's wakefulness evaluation and warning control will be described hereinafter with reference to FIGS. 3 and 5. In step S11, a wakefulness evaluating device 44 receives a psychological stimulus detection signal and makes a query to see whether or not there is any psychological stimulus to the driver. If there is any one of psychological stimuli, it is decided that driver's wakefulness is high and there is no possibility of dozed driving. If there is no psychological stimulus at all, a timer 45 is actuated in step S12 to measure time T of duration of monotonous driving operations, the time T is compared with a given time $T_s$ in step S13 and it is decided in step S14 that driver's wakefulness has declined when the time T is longer than the given time $T_s$.

When the lane width B of the lane, like those of lanes of open roads, is small, the change $\Delta R$ in radius of curvature is large or there are some one of obstacles $M_1$ to $M_3$ ahead of the vehicle 1, it is decided that there is a psychological stimulus to the driver and driver's wakefulness is high. When the vehicle is traveling on an automobile road, such as a freeway, where the lane width B is large, the change R in radius of curvature is small and only intermittent driving operations are required for monotonous traveling, and a state where there is none of the preceding vehicle $M_1$ and the moving obstacles $M_3$, such as oncoming vehicles, and there is neither psychological load on nor visual stimulus to the driver continues for an extended time, driver's wakefulness tends to decline. The declination of driver's wakefulness under such driving conditions is surely detected.

Figure 7A:
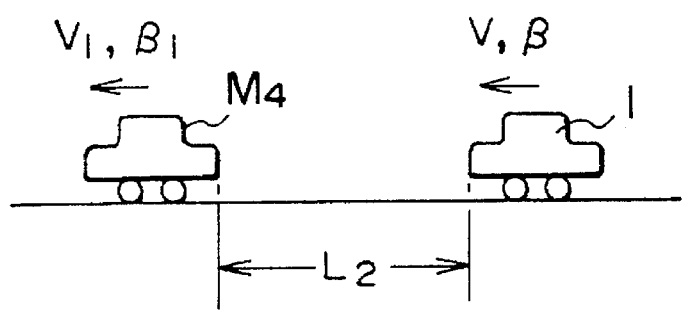
FIGS. 7(a) and 7(b) are diagrammatic view of assistance in explaining a process of estimating the possibilities of collision and off-lane travel.

Referring to FIG. 7(a), a collision possibility estimating device 46 receives the image data and a signal indicating the traveling speed V, estimates the possibility of collision of the vehicle 1 with an obstacle $M_4$ on the cruising lane and decides that the collision of the vehicle 1 with the obstacle $M_4$ is possible when the following inequality is satisfied.

$$L2 \leq (-V_1^2/2\beta_1) + (V/2\beta) + V \cdot T_2$$

where L2 is the distance between the vehicle 1 and the obstacle $M_4$, V is the traveling speed of the vehicle 1, $V_1$ is the forward traveling speed of the obstacle $M_4$, $\beta$ is a set acceleration/deceleration for the vehicle 1, $\beta_1$ is a set acceleration/deceleration for the obstacle $M_4$ and $T_2$ is a given spare time.

Figure 7B:
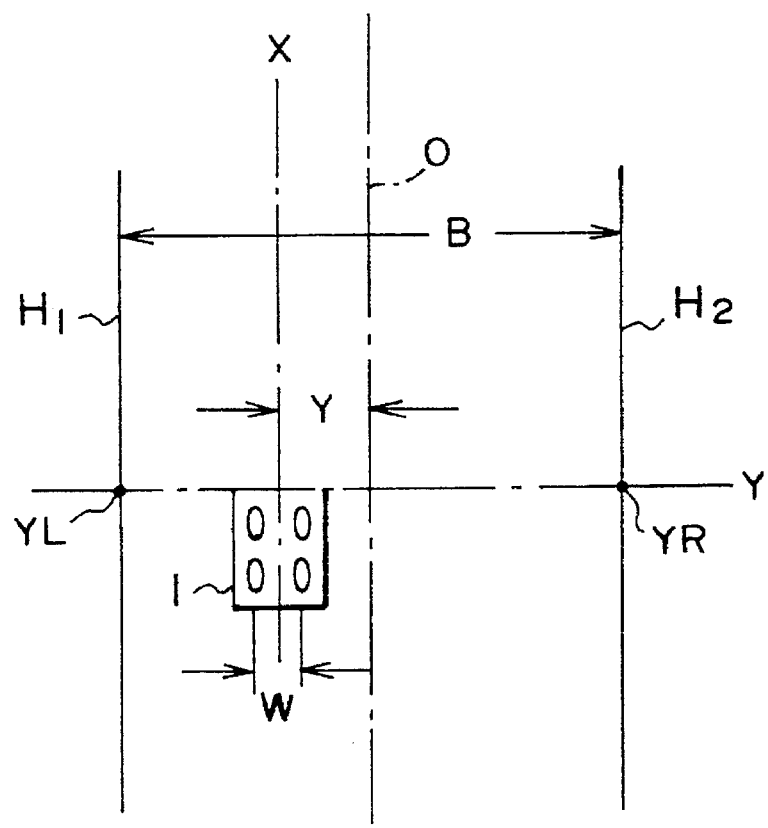
Figure 8:
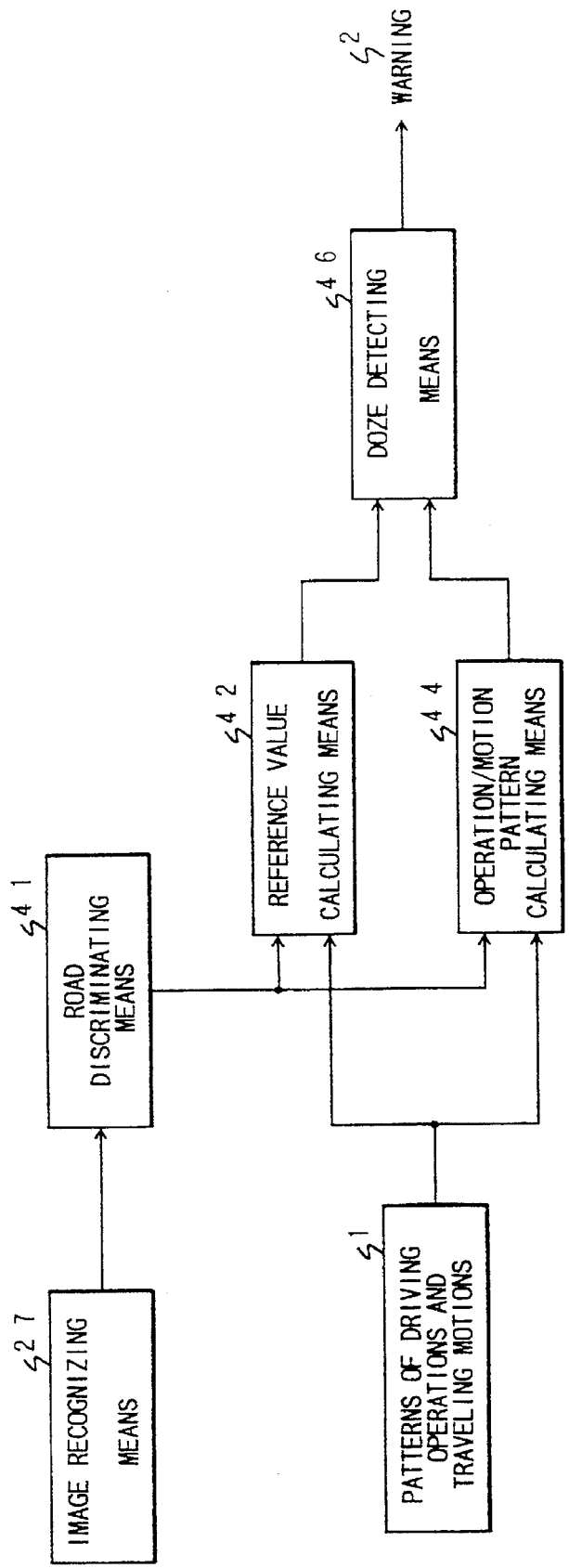
FIG. 8 is a block diagram of a warning system for a vehicle, in accordance with a second aspect of the present invention.

A off-lane travel possibility estimating device 47 receives the image data and estimates the possibility of off-lane travel of the vehicle 1. As shown in FIG. 7(b), the lane width B and Y-coordinates YR and YL of points where the Y-axis intersects the right lane mark $H_1$ and the left lane mark $H_1$, respectively, are measured and the distance Y of dislocation of the vehicle 1 from the center line O of the lane is calculated by using: Y=(B/2)−YR or Y=(YL−YR)/2. It is estimated that the vehicle 1 may travel off the left lane mark $H_1$ when Y≦−B/2−W/2 or may travel off the right lane mark $H_2$ when Y≦B/2=W/2, where W is the tread of the vehicle 1.

A warning control device 48 receives signals indicating the declination of driver's wakefulness and the estimation of possible off-lane travel, and controls a warning operation. When the declination of driver's wakefulness is detected, the warning control device 48 makes a query in step S15 to see whether or not there is the possibility of collision and, if there is no possibility of collision, makes a query in step S16 to see whether or not there is the possibility of off-lane travel. If there is no possibility of off-lane travel, the warning control device 48 gives a warning signal to a warning device 31 in step S17 to provide a warning against dozed driving in a circumstance where driver's wakefulness is low. Thus, dozed driving can be surely prevented.

When the declination of driver's wakefulness is detected and collision is possible, the given spare time $T_2$ of the aforesaid discriminant is increased by a correction ΔT for the declination of driver's wakefulness to T2+ΔT in step S18 to give the warning at an earlier stage. Thus, the condition for collision expressed by the aforesaid discriminant is satisfied at a time point earlier by the time ΔT than the time when collision is expected and the warning is given at an earlier stage. The earlier warning prevents dozed driving and secures a sufficient time necessary for the driver to operate the brake system to avoid collision, so that collision can be surely avoided.

When off-lane travel is possible, the lane width B of the aforesaid discriminant is reduced by a correction ΔB to B-ΔB in step S19 and then a warning is given. Thus, the discriminant defines conditions for a lane of a lane width smaller than the lane width B by ΔB, so that the possibility of off-lane travel is estimated at an earlier stage and the warning is given at an earlier stage. The earlier warning prevents dozed driving and secures a sufficient time for the driver to operate the steering wheel to avoid off-lane travel, so that off-lane travel can be surely avoided.

The reference values for the driving pattern and the traveling pattern may be calculated and the measured values may be processed by methods other than those explained in connection with the preferred embodiment. The warning device 31 may be of any suitable type, such as an alarm that generates an alarm sound, a display disposed within a driver's field of view or a vibration generator set in the seat cushion or the back cushion of the driver's seat, provided that the warning device is capable of effectively stimulating driver's senses.

A warning system in a second embodiment according to the present invention will be described hereinafter.

Figure 9:
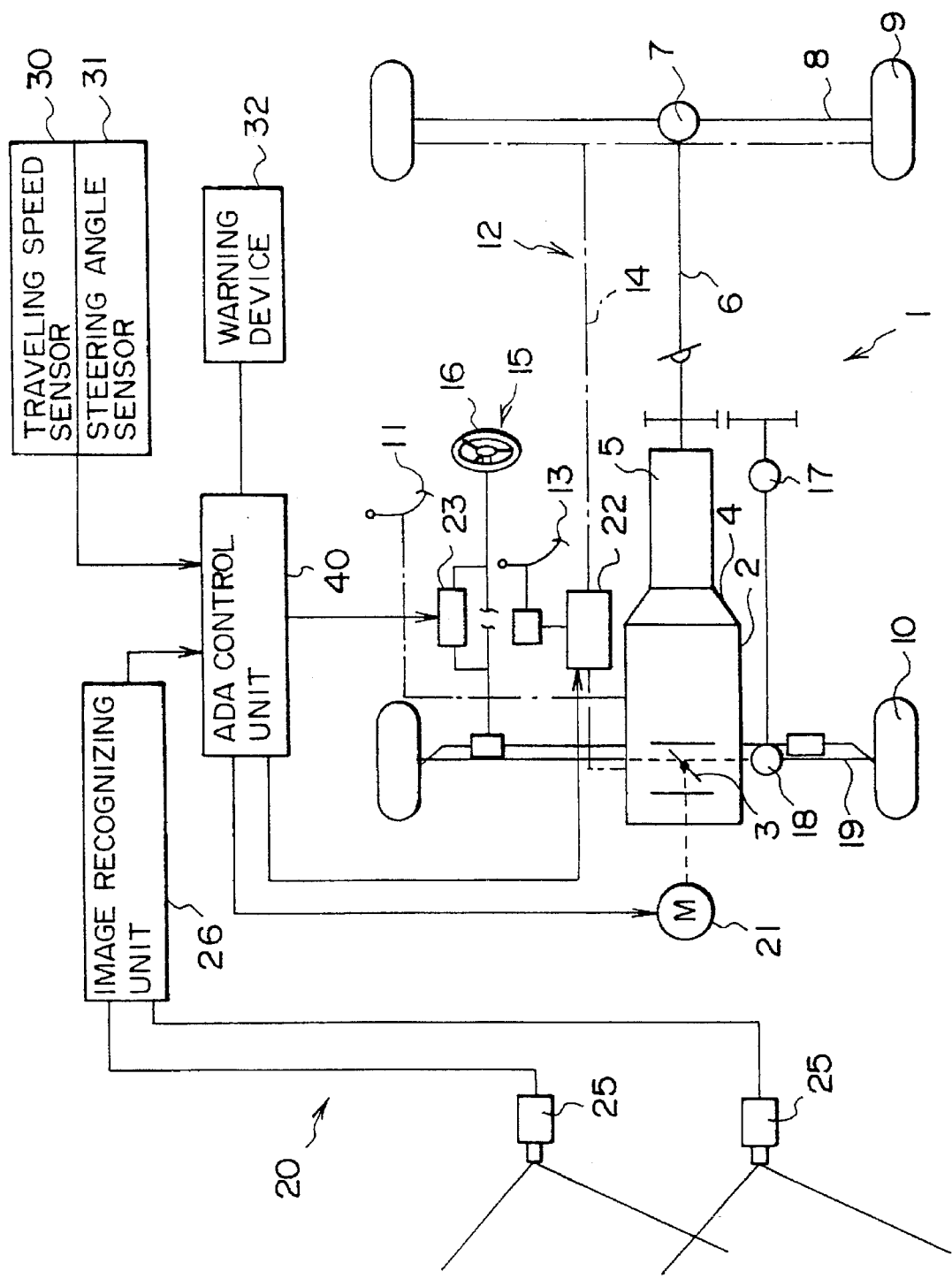
FIG. 9 is a partly diagrammatic block diagram of an ADA system and a vehicle.

An ADA system incorporated into a vehicle will be generally described with reference to FIG. 9. A vehicle 1 has an engine 2 operatively connected through a clutch 4, a transmission 5, a propeller shaft 6, a rear differential 7 and rear axles 8 to rear wheels 9, and through the transmission 5, a center differential 17, a front differential 18 and front axles 19 to front wheels 10 to drive the front wheels 10 and the rear wheels 9 for traveling. The vehicle 1 has an operation control system including an accelerator pedal 11 for operating a throttle valve 3 combined with the engine 2 to regulate the output of the engine 2, a brake system 12 including a brake pedal 13 for regulating the brake line pressure in a brake line 14 for distributing the brake line pressure to wheel cylinders combined with the front wheels 10 and the rear wheels 9, and a steering system 15 including a steering wheel 16 for steering the front wheels 10.

An ADA system 20 is provided with a throttle actuator 21 combined with the throttle valve 3 to reduce the output of the engine 2 forcibly when a throttle signal is given thereto, a brake actuator 22 connected to the brake line 14 of the brake system 12 to regulate the brake line pressure according to a brake signal for automatic braking, and a steering actuator 23 associated with the steering system 15 to control the steering wheel 16 according to a steering signal for automatic steering.

An electronic control system is provided with, for example, two CCD cameras 25 disposed on the right and the left side of the front end, respectively, of the vehicle 1, and an image recognizing unit 26 including a stereographic image processor. The two CCD cameras 25 take images of scenes and objects lying ahead of the vehicle 1 in stereographic images and provides image signals. The image recognizing unit 26 processes the output image signals of the CCD cameras 25 by triangulation to calculate the distances between the vehicle 1 and the objects lying ahead of the vehicle 1, produces a distance picture showing a three-dimensional distance distribution, detects a lane, a preceding vehicle and obstacles separately from the distance picture, recognizes lane marks, the three-dimensional configuration of the road, categorizes objects lying ahead of the vehicle 1, recognizes the distances between the vehicle 1, and the preceding vehicle and the obstacles, and relative traveling speed of the preceding vehicle, and obtains image data on the road and traffic conditions.

An ADA control unit 40 comprises a warning system which estimates various possible conditions and gives a warning, and a vehicle control system which controls the vehicle 1 when the driver fails in executing danger avoiding operations in response to a warning. The vehicle control system calculates an acceleration or deceleration on the basis of the image data and the output signals of sensors so that a safety distances are maintained between the vehicle 1 and, for example, the preceding vehicle and road facilities, and gives a throttle signal specifying a throttle opening corresponding to the calculated acceleration or deceleration to the throttle valve 21 to control the output of the engine 2. The vehicle control system gives a brake signal specifying an appropriate brake line pressure corresponding to the calculated acceleration or deceleration to the brake actuator 22 for automatic braking. Thus, the safety distances can be maintained or collision can be avoided even if the driver does not operate the vehicle 1 properly or does not carry out danger avoiding operations. The vehicle control system sets a desired course to a position at a set distance on the picture, calculates an estimated course along which the vehicle 1 will travel to the position at the set distance when the current traveling conditions are maintained, gives a steering signal corresponding to the deviation of the estimated course from the desired course to the steering actuator 23 for automatic steering. Thus, collision can be avoided and off-lane travel can be prevented even if the driver does not operate the vehicle properly.

A warning control procedure to be carried out by the warning system will be described. The warning system has a road discriminating system and a doze detecting system. The road discriminating system identifies a lane of an automobile road excluding service areas by a toll booth at the entrance of an automobile road and road signs represented by the image data, the radius of curvature and the width of the lane, the traveling speed of the vehicle 1 measured by the traveling speed sensor 30. The doze detecting system determines a driving pattern on the basis of a steering angle through which the steering wheel 16 has been turned in a given time, measured by a steering angle sensor 31, determines a traveling pattern in which the vehicle has traveled on the basis of a transverse displacement represented by the image data, decides whether or not the driver is dozing and, actuates a warning device 32 to give a warning when it is decided that there is the possibility of driver's doze.

Figure 10:
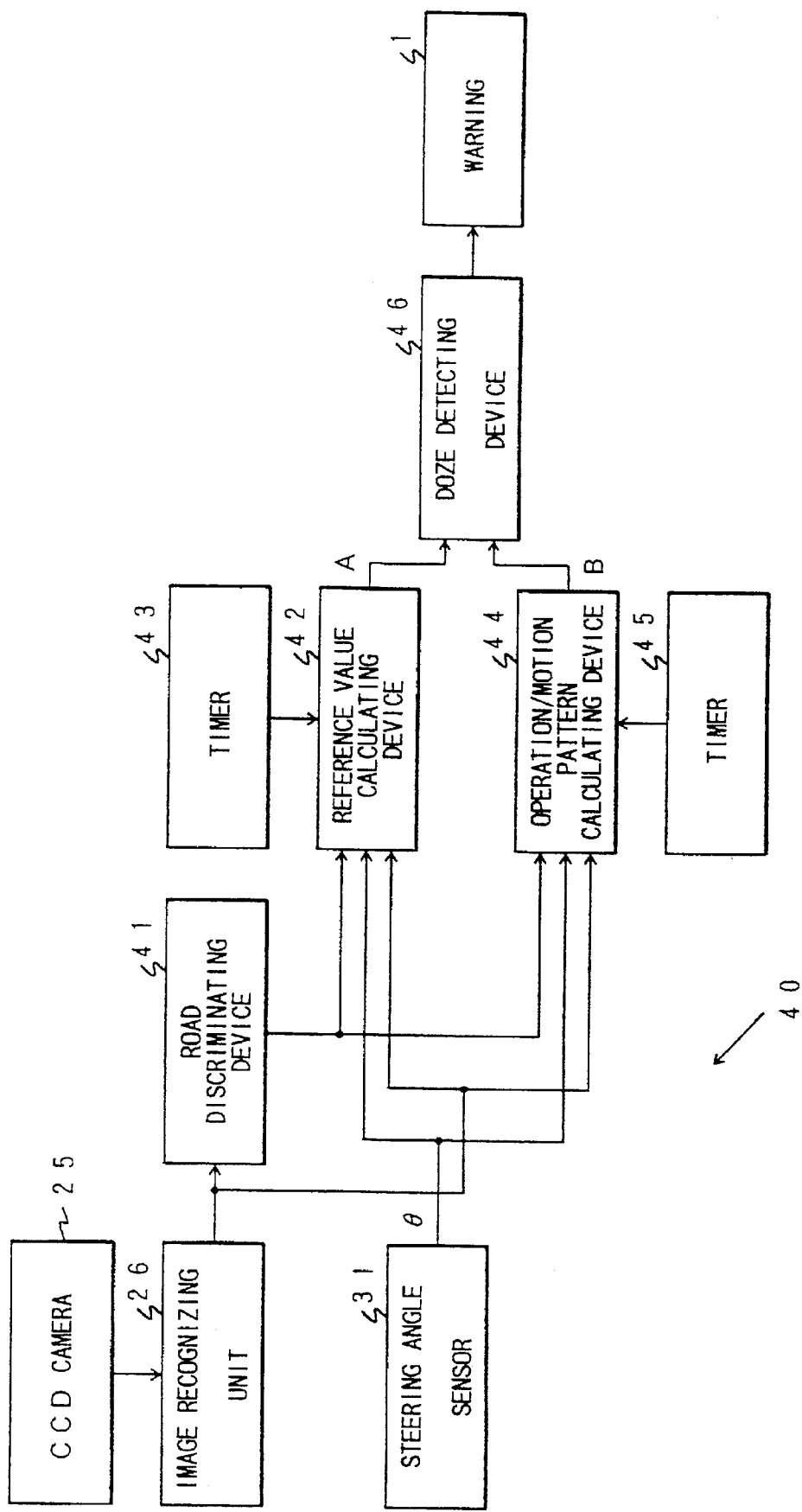
FIG. 10 is a block diagram of a warning system in a second embodiment according to the present invention.
Figure 11:
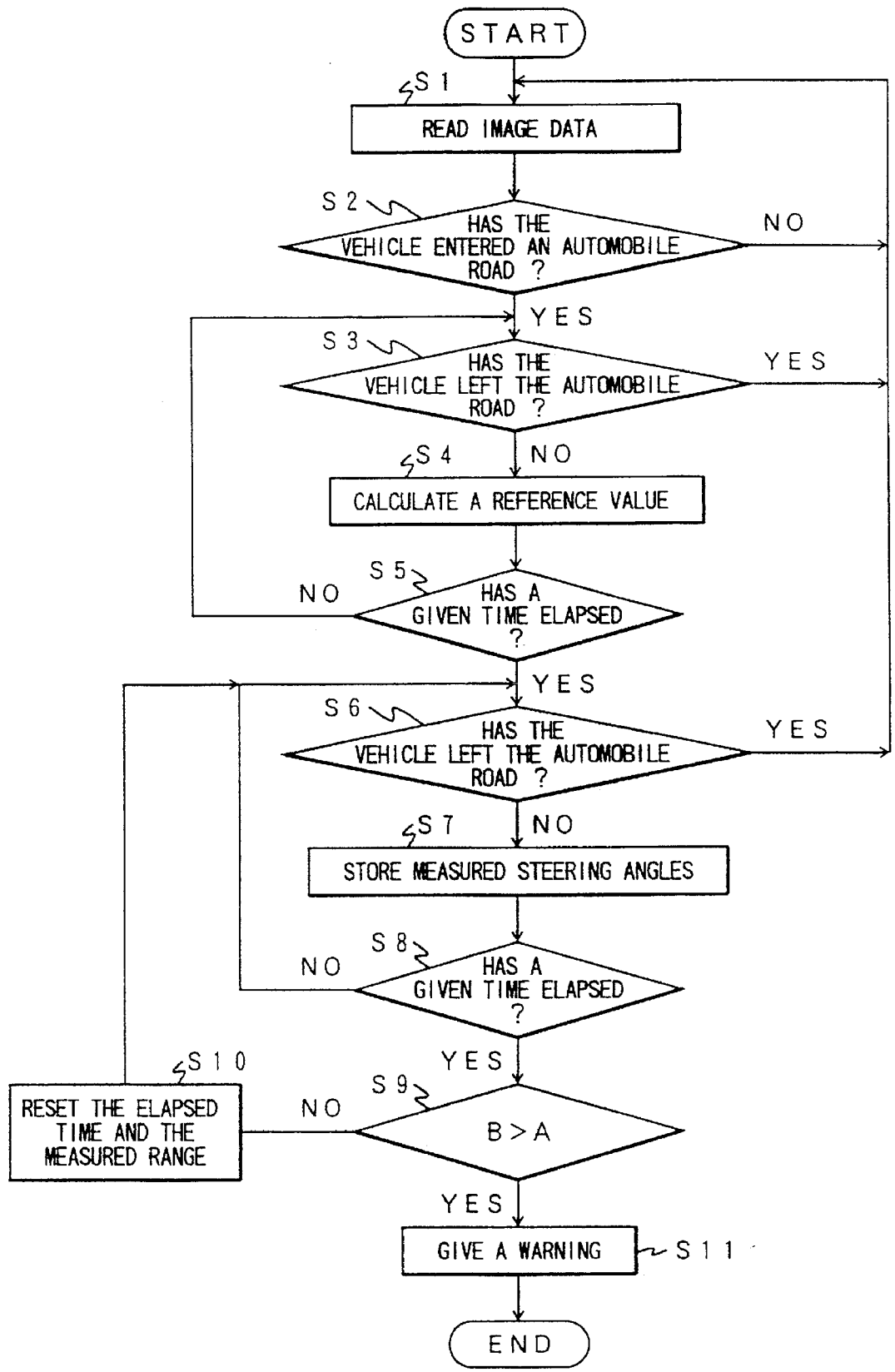
FIG. 11 is a flow chart of a road discriminating and doze detecting program.

A road discrimination control procedure and a doze detection control procedure to be carried out by the warning system in the second embodiment will be described hereinafter with reference to FIGS. 10 and 11. In step S1, the image recognizing unit 26 processes image signals provided by the two CCD cameras 25 while the vehicle 1 is traveling to obtain image data representing road conditions and traffic conditions. A road discriminating device 41 included in the ADA control unit 40 receives the image data, recognizes a toll booth and road signs from the image data and decides in step S2 whether or not the vehicle 1 has entered an automobile road. While the vehicle 1 is traveling on an automobile road, the road discriminating device 41 detects a traveling mode in which the vehicle 1 is traveling on the automobile road.

Figure 12A:
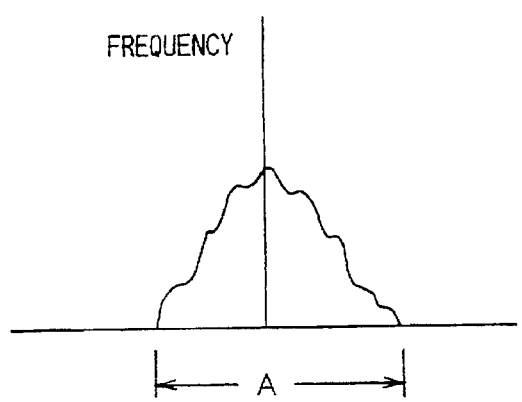
FIGS. 12(a) and 12(b) are graphs showing the distribution of a reference value and that of a measured value.

A dozed driving detection control procedure to be carried out by the warning system using a driving pattern in which the driver drives the vehicle 1 will be described. It is said that driver's wakefulness remains on the highest level in a period of about thirty minutes from the entry of the vehicle 1 into an automobile road. In step S4, a reference value calculating device 42 stores continuously steering angles $\theta$ measured by the steering angle sensor 31 in a given time of, for example, thirty minutes measured by a timer 43 until the given time elapses in step S5. A driving pattern, i.e., a frequency bar graph of steering angle, as shown in FIG. 12(a) is produced by processing the measured steering angles $\theta$ including clockwise and counterclockwise steering angles. Driver's doze can be detected on the basis of the variation of the ranges of clockwise steering angles and counterclockwise steering angles due to the declination of driver's wakefulness. Therefore, the frequency bar diagram is processed to determine a reference value A representing a reference range of steering angle distribution. Since the radii of curvature of curves in the lanes of automobile road are very large, actual steering angles $\theta$ are small and hence the reference value A is comparatively small and is suitable for use as a reference value for estimating the degree of driver's wakefulness.

In the initial stage of traveling on an automobile road, in which driver's wakefulness is on a high level, the reference value A specific to the automobile road can be accurately calculated. Since the reference value A is calculated every time the vehicle 1 enters an automobile road, the reference value A is dependent on individual variation.

Figure 12B:
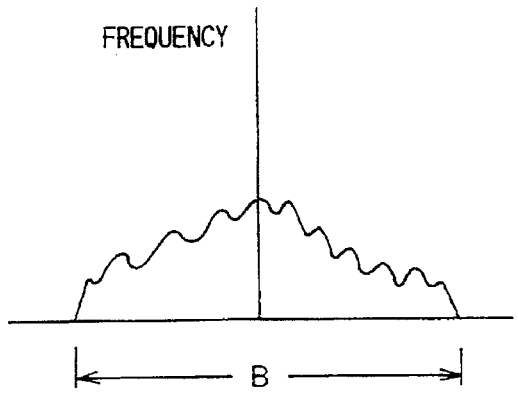

After the given time has elapsed, a decision is made in step S6 as to whether or not the vehicle 1 is on the automobile road. In step S7, an operation/motion pattern calculating device 44 stores continuously steering angles $\theta$ measured by the steering angle sensor 31 until it is decided in step S8 that a given time measured by a timer 45 has elapsed. While the vehicle 1 is traveling at a high traveling speed on an automobile road, in which no traffic signal is installed and lane width is large, requiring monotonous driving operations, and the driver is liable to become drowsy, driving patterns as shown in FIG. 12(b) are produced at given time intervals, and measured ranges B of steering angle distributions are calculated. In step S9, a doze detecting device 46 decides the degree of driver's wakefulness through the comparison of the measured range B with the reference value A. The doze detecting device 46 decides that driver's wakefulness is on a high level and resets the elapsed time and the measured range B in step S10 when the measured range B is approximately equal to the reference value A, and then a decision is made again in step S6 as to whether or not the vehicle 1 has left the automobile road. The program is ended when the decision in step S6 is affirmative. When the decision in step S6 is negative, steps S7 through S9 are repeated to calculate another measured range B. When B>A, it is decided that the driver is in dozed driving and the warning device 32 is actuate to give a warning in step S11.

Thus, deriver's doze while the driver is driving the vehicle 1 in a continuous, monotonous driving mode on the automobile road can be surely detected with reference to the reference value A indicating a driving mode in which the driver drives the vehicle 1 in the initial stage of travel on the automobile road immediately after the vehicle 1 has entered the automobile road. No warning is given while the degree of driver's wakefulness is on a comparatively high level and the measured range B is nearly equal to the reference value A. A warning is given call driver's attention when driver's wakefulness declines due to the duration of monotonous driving mode entailing increase in the measured range B due to increase in the frequencies of large clockwise and counterclockwise steering angles.

Another dozed driving detection control procedure to be carried out by the warning system using a traveling pattern in which the vehicle 1 travels will be described with reference to FIG. 10. The reference value calculating device 42 determines the distance YR(n) between the center axis of the vehicle 1 and the right lane mark and the distance between the center axis of the vehicle 1 and the left lane mark on the basis of the image data, and calculates the transverse displacement Y(n) of the vehicle 1 from the center line of the lane by using: $Y(n)=\{YL(n) -YR(n)\}/2$ at given time intervals, and calculates the standard deviation n) of the transverse displacements Y(n) measured in a given time to determine a reference value A. The operation/motion pattern calculating device 44 calculates the standard deviation of transverse displacements Y(n) of the vehicle 1 on the basis of the image data to determine a measured value B, and determines the degree of driver's wakefulness through the comparison of the reference value A and the measured value B. Thus, the behavior of the vehicle 1 can be quickly and precisely detected by using the measured value B indicating the traveling pattern of the vehicle even when the steering angle is small because the behavior of the vehicle 1 varies greatly even if the steering angle is small when the vehicle 1 is traveling at a high traveling speed on an automobile road, so that driver's doze can be accurately detected at an early stage.

Figure 13:
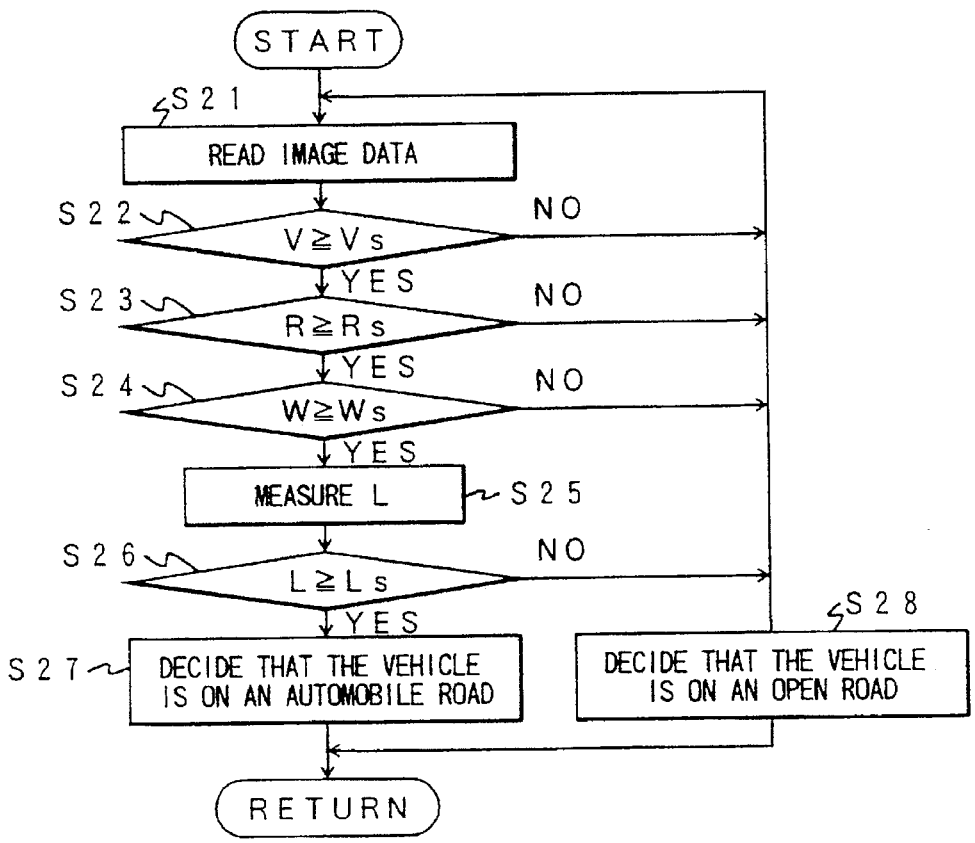
FIG. 13 is a flowchart of a road discriminating control program to be executed by a warning system in a third embodiment according to the present invention.

Another road discrimination control procedure to be carried out by the warning system will be described with reference to FIG. 13. In step S21, data on the radius R of curvature and the lane width W of the lane are retrieved from the image data, and the traveling speed V is detected. In step S22, the traveling speed V is compared with a reference traveling speed $V_s$, i.e., a reference traveling speed for traveling on an automobile road. When $V \geq V_s$, the radius R of curvature is compared with a reference radius $R_s$ of curvature, i.e., the minimum radius of curvature for an automobile road of, for example, 50 m, in step S23. When $R \geq R_s$, the lane width W is compared with a reference lane width $W_s$, i.e., the minimum lane width for an automobile road of, for example, 3.75 m, in steps S24.

When those three conditions: $V \geq V_s$, $R \geq R_s$ and $W \geq W_s$ are satisfied, a distance L of travel in a given time is measured in step S25 and the distance L is compared with a reference distance $L_s$ in step S26. If $L \geq L_s$, it is decided that the vehicle 1 is traveling on an automobile road. If any one of the three conditions: $V \geq V_s$, $R \geq R_s$ and $W \geq W_s$ is not satisfied or if those three conditions are not satisfied continuously while the vehicle 1 travels through the reference distance $L_s$, it is decided in step S28 that the vehicle 1 is traveling on an open road.

Whereas the reference value A determined at the initial stage of traveling on the automobile road must be used for the doze detection control operation even if different drivers drive the vehicle 1 by turns or if the tires are fitted with tire chains at a rest area in expectation of snow-covered road ahead when the road on which the vehicle 1 is traveling is identified to be an automobile road through the recognition of the toll booth and the road signs represented by the image data, the traveling speed V decreases below the reference traveling speed $V_s$ if the vehicle 1 is stopped to change the drivers or to fit the tires with tire chains, the reference value A is cleared and a new reference value A meeting the new driver and the new condition of the vehicle 1 is determined when the road is identified by this road discrimination control procedure because this road discrimination control procedure identifies the road on which the vehicle 1 is traveling to be an automobile road on the basis of the configuration of the road specific to an automobile road represented by the image data, and the traveling speed of the vehicle 1.

The reference value and the measured value indicating the driving pattern and the traveling pattern may be calculated by methods other than those specifically described herein. The warning device 32 may be of any suitable type, such as an alarm that generates an alarm sound, a display disposed within a driver's field of view or a vibration generator set in the seat cushion or the back cushion of the driver's seat, provided that the warning device is capable of effectively stimulating driver's senses.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A warning system for a vehicle, comprising:
   an image recognizing means capable of obtaining three-dimensionally image data on the road extending ahead of the vehicle and traffic conditions;
   a psychological stimulus deciding means for deciding whether or not there is any one of psychological stimuli to the driver including moving objects and obstacles in the user's field of view on the basis of the image data on the configuration of the road extending ahead of the vehicle, traffic conditions and the traveling speed of the vehicle;
   a wakefulness evaluating means for deciding that the driver's wakefulness is high when there is even a single psychological stimulus to the driver or that the driver's wakefulness has declined when a state where there is no psychological stimulus at all to the driver continues for a given time;
   a collision possibility estimating means for estimating the possibility of collision of the vehicle with an obstacle on the basis of the image data and the traveling speed of the vehicle;
   an off-lane travel possibility estimating means for estimating the possibility of off-lane travel of the vehicle on the basis of the image data; and
   a warning control means for timing the issuance of a warning when the wakefulness evaluating means decides that the driver's wakefulness has declined, when the collision possibility estimating means estimates collision to be possible or when the off-lane travel possibility estimating means estimates off-lane travel to be possible.

2. A warning system for a vehicle, according to claim 1, wherein the psychological stimulus deciding means decides that the environment is psychologically stimulative when the environment provides at least one of conditions that the width of the lane is not greater than a set width, that the variation of the radius of curvature of the lane is not less than a set value, that there is a preceding vehicle, that there is the possibility of the vehicle colliding with a preceding vehicle, that there are parking vehicles on the road and that there are obstacles on the road, or decides that the environment is not psychologically stimulative when the environment does not provide any one of those conditions.

3. A warning system for a vehicle, according to claim 1, wherein the warning control means times a collision possibility estimating operation, an off-lane travel possibility estimating operation and a warning operation so that the possibilities of collision and the possibility of off-lane travel are estimated earlier when the wakefulness evaluating means decides that the driver's wakefulness has declined.

4. A warning system for a vehicle, comprising;
   an image recognizing means capable of obtaining three-dimensional image data on the road extending ahead of the vehicle and traffic conditions;
   a road discriminating means for discriminating between-automobile roads and open roads on the basis of the image data and traveling condition;
   a reference value calculating means for determining patterns of driving operations and traveling motions in a given time at the initial stage of travel on a road when the road on which the vehicle is traveling is identified to be an automobile road and calculating a reference value specific to the automobile road;
   an operation/motion pattern calculating means for repeatedly determining patterns of driving operations and traveling motions and processing the measured values after the given time at the initial stage of travel on the road has elapsed while the vehicle is traveling on an automobile road; and
   a dozing detecting means for detecting driver's doze by comparing the reference value and the measured value and giving a warning upon the detection of driver's doze.

5. A warning system for a vehicle, according to claim 4, wherein the road discriminating means identifies an automobile road by toll booth and road signs represented by the image data or by traveling speed, the configuration and the size of the road represented by the image data, and a distance covered in a given time.

6. A warning system for a vehicle, according to claim 4, wherein the reference value calculating means calculates a transverse displacement of the vehicle relative to the lane on the basis of the image data, calculates a reference value defining the traveling pattern of the vehicle using standard deviation of transverse displacements in a given time, and the operation/motion pattern calculating means processes measured values specifying the traveling pattern.

* * * * *